United States Patent
Chang et al.

(10) Patent No.: US 9,702,681 B2
(45) Date of Patent: Jul. 11, 2017

(54) SYSTEM AND METHOD FOR TEMPERATURE COMPENSATION OF MEASUREMENT MACHINE

(71) Applicant: HONG FU JIN PRECISION INDUSTRY (ShenZhen) CO., LTD., Shenzhen (CN)

(72) Inventors: Chih-Kuang Chang, New Taipei (TW); Hua-Wei Yang, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 1140 days.

(21) Appl. No.: 13/802,901

(22) Filed: Mar. 14, 2013

(65) Prior Publication Data

US 2013/0289917 A1    Oct. 31, 2013

(30) Foreign Application Priority Data

Apr. 28, 2012  (CN) .......................... 2012 1 0129895

(51) Int. Cl.
*G05B 5/00*  (2006.01)
*G01B 21/04*  (2006.01)
(Continued)

(52) U.S. Cl.
CPC ........ *G01B 5/0014* (2013.01); *B23Q 11/0003* (2013.01); *G01B 11/03* (2013.01); *G01B 21/045* (2013.01); *G05B 2219/37193* (2013.01)

(58) Field of Classification Search
CPC .............................. G01B 5/008; G01B 5/0014
(Continued)

(56) References Cited

U.S. PATENT DOCUMENTS 4,340,883 A * 7/1982 Cook ................... H03M 1/1028
                                                    324/99 D
5,031,331 A * 7/1991 Herzog ................ G01B 11/005
                                                    33/702

(Continued)

FOREIGN PATENT DOCUMENTS

CN    100462677 A    2/2009
TW    200704914 A    2/2007

*Primary Examiner* — Gregory J Toatley
*Assistant Examiner* — Michael Dalbo
(74) *Attorney, Agent, or Firm* — Steven Reiss

(57) ABSTRACT

A computing device connects with a measurement machine. The measurement machine includes a raster ruler and a measurement unit. The computing device reads environmental temperatures from a temperature sensor. Compensation coefficients of the standard workpiece and compensation coefficients of the raster ruler are calculated. The computing device calculates total compensation coefficients of the standard workpiece and the raster ruler. When the measurement machine measures an object workpiece, the computing device calculates a total error of the object workpiece according to the total compensation coefficients of the standard workpiece and the total compensation coefficients of the raster ruler. Coordinates of the object workpiece are calculated according to the total error and mechanism coordinates of each axis of the measurement machine.

9 Claims, 4 Drawing Sheets

(51) Int. Cl.
*G01B 11/03* (2006.01)
*B23Q 11/00* (2006.01)
*G01B 5/00* (2006.01)

(58) Field of Classification Search
USPC .......................................................... 702/95
See application file for complete search history.

(56) References Cited

U.S. PATENT DOCUMENTS

| | | | |
|---|---|---|---|
| 7,266,903 B2 * | 9/2007 | Sato ..................... | G05B 19/404 33/702 |
| 2004/0066831 A1 * | 4/2004 | Shivaswamy ........ | G01B 5/0014 374/55 |
| 2010/0014099 A1 | 1/2010 | Christoph et al. | |
| 2012/0236320 A1 * | 9/2012 | Steffey ................. | G01B 11/002 356/614 |

* cited by examiner

SYSTEM AND METHOD FOR TEMPERATURE COMPENSATION OF MEASUREMENT MACHINE

BACKGROUND

1. Technical Field

Embodiments of the present disclosure relate to measurement machine management systems and methods, and particularly to a system and a method for temperature compensation of a measurement machine.

2. Description of Related Art

When a measurement machine measures a workpiece, some environment factors may cause errors in measurement. The most important environment factor is environmental temperature. Under certain temperatures, the workpiece and a raster ruler of the measurement machine may become deformed. And deformation may result in measurement errors.

DETAILED DESCRIPTION

The disclosure, including the accompanying drawings, is illustrated by way of examples and not by way of limitation. It should be noted that references to "an" or "one" embodiment in this disclosure are not necessarily to the same embodiment, and such references mean "at least one."

In general, the word "module," as used herein, refers to logic embodied in hardware or firmware unit, or to a collection of software instructions, written in a programming language. One or more software instructions in the modules may be embedded in firmware unit, such as in an EPROM. The modules described herein may be implemented as either software and/or hardware modules and may be stored in any type of non-transitory computer-readable medium or other storage device. Some non-limiting examples of non-transitory computer-readable media may include CDs, DVDs, BLU-RAY, flash memory, and hard disk drives.

Figure 1:
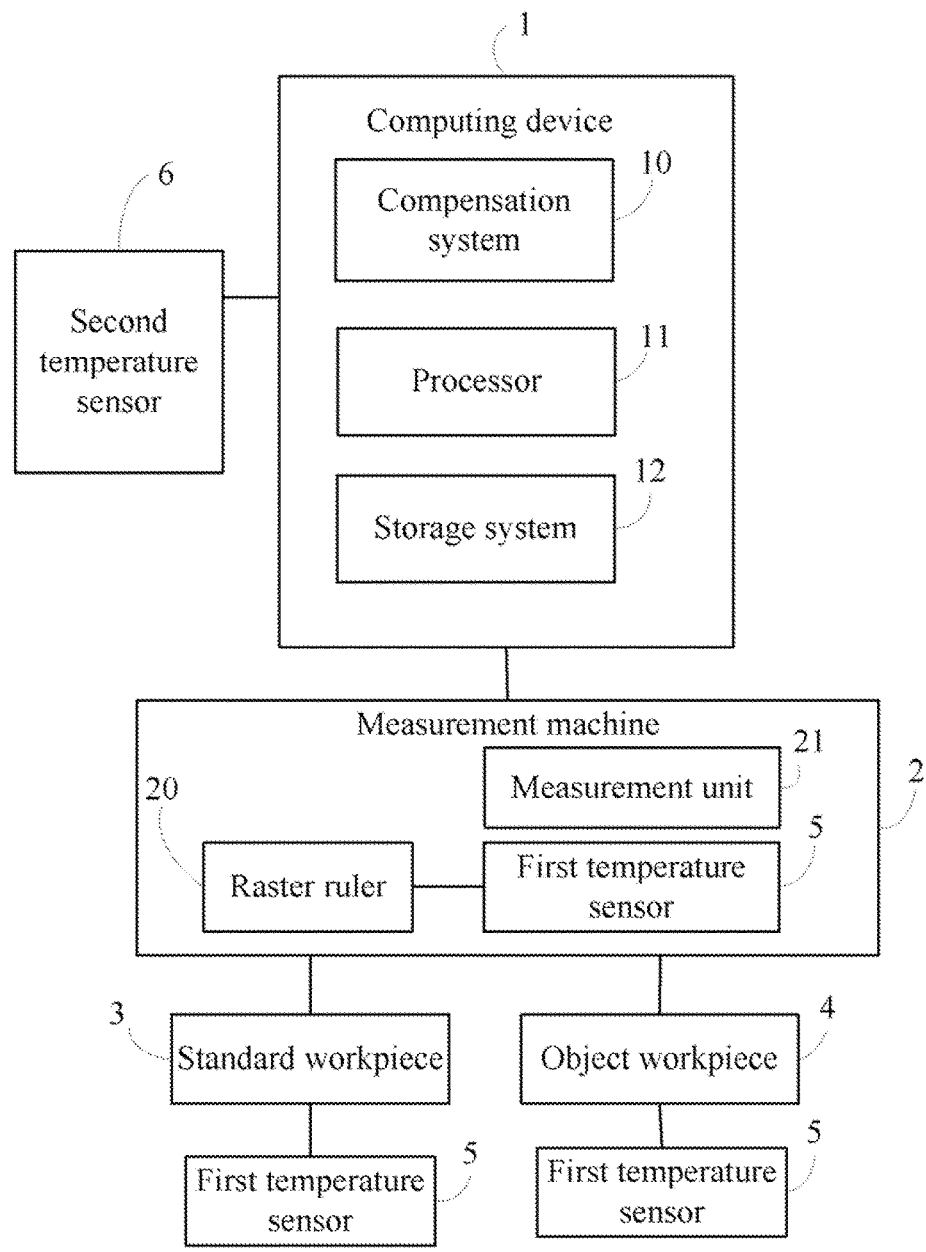
FIG. 1 is a block diagram of one embodiment of a computing device including a compensation system.

FIG. 1 is a block diagram of one embodiment of a computing device 1. The computing device 1 is electronically connected with a measurement machine 2. The measurement machine 2 includes a raster ruler 20 and a measurement unit 21. The measurement machine 2 has an x-axis, a y-axis, and a z-axis. The measurement unit 21 measures a length of a standard workpiece 3, a length of an object workpiece 4, and a scale of the raster ruler 20. The standard workpiece 3 may be a line scale or a gauge block. The raster ruler 20, the standard workpiece 3 and the object workpiece 4 respectively has a first temperature sensor 5, which measures temperature values of the raster ruler 20, the standard workpiece 3 and the object workpiece 4.

The computing device 1 connects with a second temperature sensor 6. The second temperature sensor 6 obtains environmental temperatures. The computing device 1 includes a compensation system 10, at least one processor 11 and a storage system 12. The compensation system 10 compensates the length of the object workpiece 4 and the scale value of the raster ruler 20 under different environmental temperatures. The storage system 12 stores coordinates of each axis of the measurement machine 2, a predetermined length predetermined of the standard workpiece 3 and a predetermined scale value of the raster ruler 20.

Figure 2:
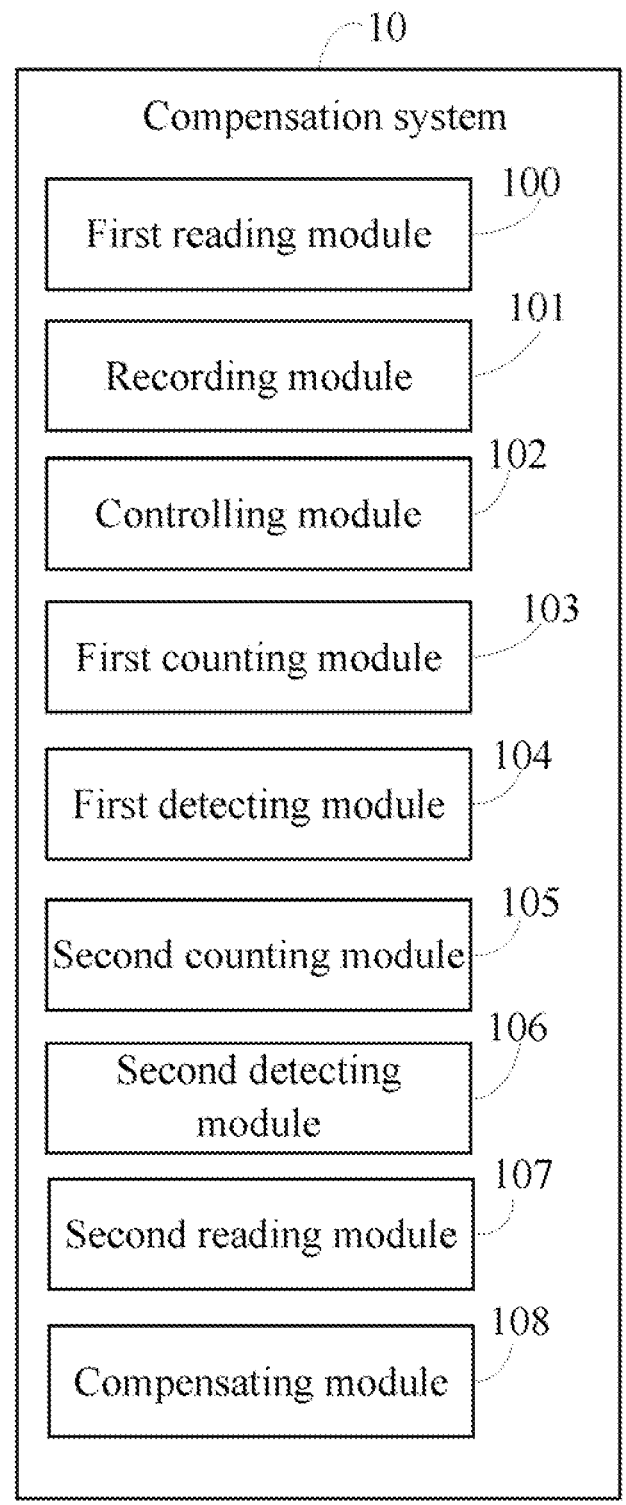
FIG. 2 is a block diagram of one embodiment of function modules of the compensation system in FIG. 1.

As shown in FIG. 2, the compensation system 10 includes a first reading module 100, a recording module 101, a controlling module 102, a first counting module 103, a first detecting module 104, a second counting module 105, a second detecting module 106, a second reading module 107, and a compensating module 108. The modules 100-108 comprise computerized instructions in the form of one or more programs that are stored in the storage system 12 and executed by the at least one processor 11 to provide functions of the modules 100-108.

The first reading module 100 reads an environmental temperature from the second temperature sensor 6. The first reading module 100 also reads a temperature of the standard workpiece 3 and a temperature of the raster ruler 20 from the first temperature sensors 5 of the standard workpiece 3 and the raster ruler 20. Furthermore, the first reading module 100 calculates a first difference between the temperature of the standard workpiece 3 and the environmental temperature, and calculates a second difference between the temperature of the raster ruler 20 and the environmental temperature. The first reading module 100 detects whether the first difference and the second difference are in an allowable error range.

When the first difference and the second difference are in the allowable error range, the recording module 101 records the temperatures of the standard workpiece 3 and the raster ruler 20.

The controlling module 102 controls the measurement unit 21 to measure a length of the standard workpiece 3 and a scale value of the raster ruler 20. The controlling module 102 calculates a first offset value of the standard workpiece 3 according to the length and the predetermined length of the standard workpiece 3, and calculates a second offset value of the raster ruler 20 according to the scale value and the predetermined scale value of the raster ruler 20. For example, if the predetermined length of the workpiece 3 is X1 and the length of the workpiece 3 is X2, the first offset value of the standard workpiece 3 is calculated as X2−X1.

The first counting module 103 increases a first measuring time of the standard workpiece 3 and increases a second measuring time of the raster ruler 20. Initial values of the first measuring time and the second measuring time are 0. When the controlling module 102 controls the measurement unit 21 to measure the length of the standard workpiece 3 and the scale value of the raster ruler 20 under an environmental temperature, the measuring time is increased.

The first detecting module 104 detects whether the first measuring time and the second measuring time are less than a predefined measuring time. If the first measuring time and the second measuring time are equal to or more than the predefined measuring time, the first detecting module 104 calculates compensation coefficients of the standard workpiece 3 and compensation coefficients of the raster ruler 20 under the environmental temperature, according to the first offset value, the second offset value, the first measuring time, the second measuring time, and coordinates of each axis of the measurement machine 2. The compensation coefficients includes a compensation coefficient of x-axis, a compensation coefficient of y-axis and a compensation coefficient of z-axis. For example, if the first measuring time is "N" and a coordinate of the x-axis of the measurement machine 2 is L, the compensation coefficient of the standard workpiece 3 on the x-axis "a"=(ΣX3/N)*1000/L.

The second counting module 105 increases a number of the environmental temperature measured by the second temperature sensor 6. In one embodiment, an initial number of the environmental temperature is 0.

The second detecting module 106 detects whether the number of the environmental temperature is less than a predefined number. When the number of the environmental temperature is equal to or more than the predefined number, the second detecting module 106 calculates total compensation coefficients of the standard workpiece 3 and the raster ruler 20, according to the compensation coefficients of the standard workpiece 3 and the raster ruler 20 of the measurement machine 2, and the number of the environmental temperature. The total compensation coefficients include a total compensation coefficient of x-axis, a total compensation coefficient of y-axis, and a total compensation coefficient of z-axis. In one embodiment, if the number of the environmental temperature is "J", the total compensation coefficient "A1" of x-axis of the standard workpiece 3 is: "A1"=Σα/J. The "a" in the formula represents the compensation coefficient of the standard workpiece 3 on the x-axis. The second detecting module 106 calculates the total compensation coefficient "A2" of the raster ruler 20 by using the same formula for computing "A1".

When the measurement machine 2 measures the object workpiece 4, the second reading module 107 reads a temperature "T1" of the object workpiece 4 from the first temperature sensor 5 of the object workpiece 4, a temperature "T2" of the raster ruler 20 from the first temperature sensor 5 of the raster ruler 20, and an environmental temperature "T" from the second temperature sensor 5. The second reading module 107 also calculates a total error "ΔL" of the object workpiece 4 of each axis according to the temperature "T1", the temperature "T2", the environmental temperature "T", the total compensation coefficient "A1" of the standard workpiece, and the total compensation coefficient "A2" of the raster ruler. Each axis may be x-axis, y-axis, or z-axis. A formula for calculating the total error "ΔL" is: ΔL=L[A1*(T1−T)−A2*(T2−T)].

The compensating module 108 calculates coordinates of the object workpiece 4 according to the total error "ΔL" and the coordinates of the measurement machine 2.

Figure 3:
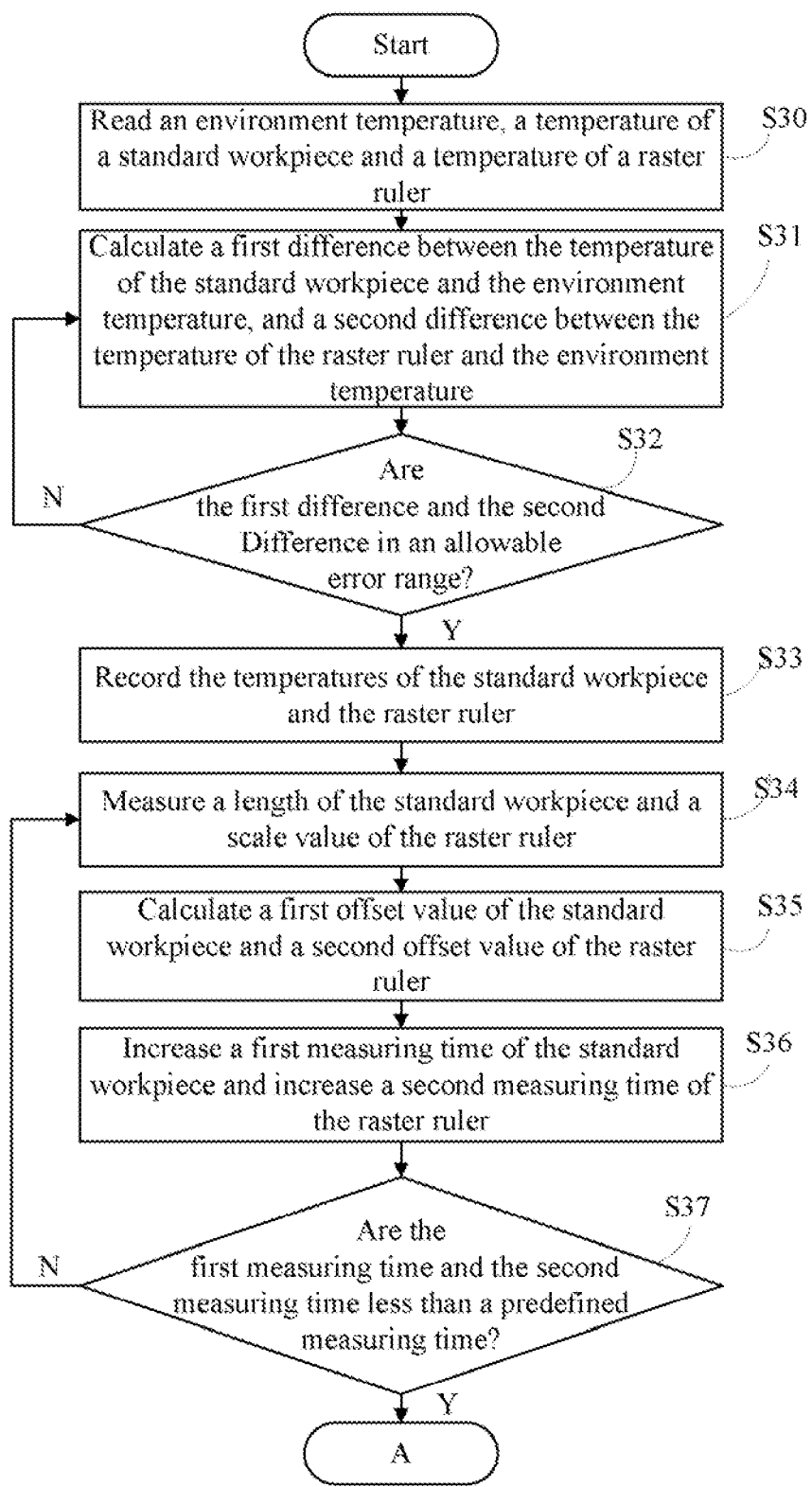
FIG. 3 and FIG. 4 are flowcharts illustrating embodiments of a method for temperature compensation of a measurement machine.
Figure 4:
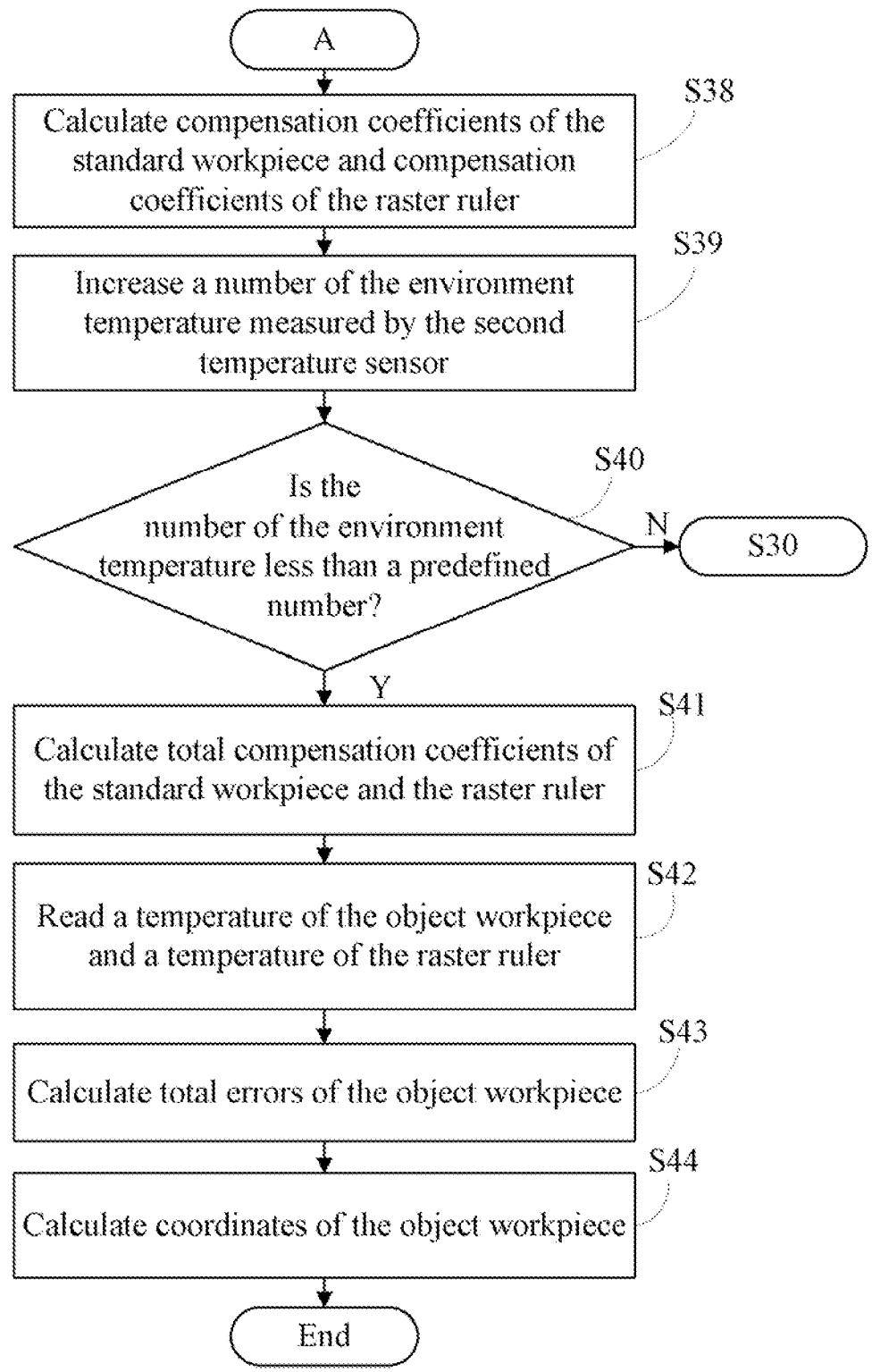

FIG. 3 and FIG. 4 are flowcharts illustrating a method for temperature compensation of the measurement machine 2 in FIG. 1. Depending on the embodiment, additional steps may be added, others removed, and the ordering of the steps may be changed.

In step S30, the first reading module 100 reads an environmental temperature from the second temperature sensor 6, and reads a temperature of the standard workpiece 3 and a temperature of the raster ruler 20 from the first temperature sensors 5.

In step S31, the first reading module 100 calculates a first difference between the temperature of the standard workpiece 3 and the environmental temperature, and a second difference between the temperature of the raster ruler 20 and the environmental temperature.

In step S32, the first reading module 100 detects whether the first difference and the second difference are in an allowable error range. If the first difference or the second difference is outside the allowable error range, the process goes back to step S31. If the first difference and the second difference are in the allowable error range, step S33 is implemented.

In step S33, the recording module 101 records the temperatures of the standard workpiece 3 and the raster ruler 20.

In step S34, the controlling module 102 controls the measurement unit 21 to measure a length of the standard workpiece 3 and a scale value of the raster ruler 20.

In step S35, the controlling module 102 calculates a first offset value of the standard workpiece 3 according to the length and the predetermined length of the standard workpiece 3, and calculates a second offset value of the raster ruler 20 according to the scale value and the predetermined scale value of the raster ruler 20.

In step S36, the first counting module 103 increases a first measuring time of the standard workpiece 3 and increases a second measuring time of the raster ruler 20. For example, the first counting module 103 increases the first measuring time by one.

In step S37, the first detecting module 104 detects whether the first measuring time and the second measuring time are less than a predefined measuring time. If the first measuring time or the second measuring time is less than the predefined measuring time, the process returns to step S34. If the first measuring time and the second measuring time are more than or equal to the predefined measuring time, step S38 is implemented.

In step S38, the first detecting module 104 calculates compensation coefficients of the standard workpiece 3 and compensation coefficients of the raster ruler 20 under the environmental temperature according to the first offset value, the second offset value, the first measuring time, the second measuring time, and coordinates of each axis of the measurement machine 2. For example, if the first measuring time is N and a coordinate of the x-axis of the measurement machine 2 is L, the compensation coefficient of the standard workpiece 3 on the x-axis "a"=(ΣX3/N)*1000/L.

In step S39, the second counting module 105 increases a number of the environmental temperature measured by the second temperature sensor 6.

In step S40, the second detecting module 106 detects whether the number of the environmental temperature is less than a predefined number. If the number of the environmental temperature is less than the predefined number, procedure returns to step S30. If the number of the environmental temperature is more than or equal to the predefined number, S41 is implemented.

In step S41, the second detecting module 106 calculates total compensation coefficients of the standard workpiece 3 and the raster ruler 20 according to the compensation coefficients of the standard workpiece 3 and the raster ruler 20, and the number of the environmental temperature. In one embodiment, if the number of the environmental temperature is "J", the total compensation coefficient of the standard workpiece 3 "A1"=Σα/J. The second detecting module 106 calculates the total compensation coefficient of the raster ruler 20 "A2" by using the same formula as "A1".

In step S42, when the measurement machine 2 measures the object workpiece 4, the second reading module 107 reads a temperature "T1" of the object workpiece 4 and a temperature "T2" of the raster ruler 20 from the first temperature sensors 5, and reads an environmental temperature "T" from the second temperature sensor 5.

In step S43, the second reading module 107 calculates a total error "ΔL" of each axis of the object workpiece 4 according to the temperature "T1", the temperature "T2", the environmental temperature "T", the total compensation coefficient "A1" of the standard workpiece, and the total compensation coefficient "A2" of the raster ruler. A formula of calculating the total error "ΔL" is ΔL=L[A1*(T1−T)−A2*(T2−T)].

In step S44, the compensating module 108 calculates coordinates of the object workpiece 4 according to the total error and the coordinates of each axis of the measurement machine 2.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A computing device, comprising:
a storage system;
at least one processor; and
one or more programs stored in the storage system and executed by the at least one processor, the one or more programs comprising:
a first reading module reading an environmental temperature, a temperature of a standard workpiece, and a temperature of a raster ruler of a measurement machine connected to the computing device, calculating a first difference between the temperature of the standard workpiece and the environmental temperature, calculating a second difference between the temperature of the raster ruler and the environmental temperature, and detecting whether the first difference and the second difference being in an allowable error range;
a recording module recording the temperatures of the standard workpiece and the raster ruler when the first difference and the second difference being in the allowable error range;
a controlling module controlling a measurement unit of the computing device to measure a length of the standard workpiece and a scale value of the raster ruler;
wherein the controlling module further calculates a first offset value of the standard workpiece according to the length and a predetermined length of the standard workpiece, and calculates a second offset value of the raster ruler according to the scale value and a predetermined scale value of the raster ruler;
a first detecting module calculating compensation coefficients of the standard workpiece and compensation coefficients of the raster ruler according to the first offset value, the second offset value, a first measuring time for measuring the standard workpiece, a second time for measuring the raster ruler, and coordinates of each axis of the measurement machine;
a second detecting module calculating total compensation coefficients of the standard workpiece and the raster ruler according to the compensation coefficients of the standard workpiece and the raster ruler, and a number of environmental temperatures under which the standard workpiece and the raster ruler being measured;
a second reading module calculating a total error of an object workpiece according to a temperature of the object workpiece, a current temperature of the raster ruler, a current environmental temperature, the total compensation coefficients of the standard workpiece, and the total compensation coefficients of the raster ruler; and
a compensating module calculating coordinates of the object workpiece according to the total error and coordinates of the measurement machine.

2. The computing device as described in claim 1, wherein the one or more programs further comprises: a first counting module increasing the first measuring time when the measurement unit measuring the length of the standard workpiece, and increasing the second measuring time when the measurement unit measuring the scale value of the raster ruler.

3. The computing device as described in claim 1, wherein the one or more programs further comprises: a second counting module increasing the number of the environmental temperature.

4. A method being executed by a processor of a computing device for temperature compensation of a measurement machine, comprising:
reading an environmental temperature, a temperature of a standard workpiece, and a temperature of a raster ruler of a measurement machine;
calculating a first difference between the temperature of the standard workpiece and the environmental temperature, and a second difference between the temperature of the raster ruler and the environmental temperature;
detecting whether the first difference and the second difference being in an allowable error range;
recording the temperatures of the standard workpiece and the raster when the first difference and the second difference being in the allowable error range;
controlling a measurement unit of the computing device to measure a length of a standard workpiece and a scale value of a raster ruler of the measurement machine;
calculating a first offset value of the standard workpiece according to the length and a predetermined length of the standard workpiece, and calculating a second offset value of the raster ruler according to the scale value and a predetermined scale value of the raster ruler;
calculating compensation coefficients of the standard workpiece and compensation coefficients of the raster ruler according to the first offset value, the second offset value, a first measuring time for measuring the standard workpiece, a second time for measuring the raster ruler, and coordinates of each axis of the measurement machine;
calculating total compensation coefficients of the standard workpiece and the raster ruler according to the compensation coefficients of the standard workpiece and the raster ruler, and a number of environmental temperatures that the standard workpiece and the raster ruler being measured;
calculating a total error of an object workpiece according to a temperature of the object workpiece, a current temperature of the raster ruler, a current environmental temperature, the total compensation coefficients of the standard workpiece, and the total compensation coefficients of the raster ruler; and
calculating coordinates of the object workpiece according to the total error and coordinates of the measurement machine of each axis.

5. The method as described in claim 4, further comprising:
increasing the first measuring time when the measurement unit measures the length of the standard workpiece; and
increasing the second measuring time when the measurement unit measures the scale value of the raster ruler.

6. The method as described in claim 4, further comprising:
increasing the number of the environmental temperature.

7. A non-transitory storage medium having stored thereon instructions that, when executed by a processor, causes the processor to perform a method for temperature compensation of a measurement machine, the method comprising:

reading an environmental temperature, a temperature of a standard workpiece and a temperature of a raster ruler of a measurement machine;

calculating a first difference between the temperature of the standard workpiece and the environmental temperature, and a second difference between the temperature of the raster ruler and the environmental temperature;

detecting whether the first difference and the second difference being in an allowable error range;

recording the temperatures of the standard workpiece and the raster when the first difference and the second difference being in the allowable error range;

controlling a measurement unit of the computing device to measure a length of a standard workpiece and a scale value of a raster ruler of the measurement machine;

calculating a first offset value of the standard workpiece according to the length and a predetermined length of the standard workpiece, and calculating a second offset value of the raster ruler according to the scale value and a predetermined scale value of the raster ruler;

calculating compensation coefficients of the standard workpiece and compensation coefficients of the raster ruler according to the first offset value, the second offset value, a first measuring time for measuring the standard workpiece, a second time for measuring the raster ruler, and coordinates of each axis of the measurement machine;

calculating total compensation coefficients of the standard workpiece and the raster ruler according to the compensation coefficients of the standard workpiece and the raster ruler, and a number of environmental temperatures that the standard workpiece and the raster ruler being measured;

calculating a total error of an object workpiece according to a temperature of the object workpiece, a temperature of the raster ruler, an environmental temperature, the total compensation coefficients of the standard workpiece, and the total compensation coefficients of the raster ruler; and calculating coordinates of the object workpiece according to the total error and coordinates of the measurement machine of each axis.

8. The non-transitory storage medium as described in claim 7, wherein the method further comprises:

increasing the first measuring time when the measurement unit measuring the length of the standard workpiece; and increasing the second measuring time when the measurement unit measuring the scale value of the raster ruler.

9. The non-transitory storage medium as described in claim 7, wherein the method further comprises: increasing the number of the environmental temperatures.

* * * * *